(12) United States Patent
Luo

(10) Patent No.: US 8,744,462 B2
(45) Date of Patent: Jun. 3, 2014

(54) METHOD FOR IMPROVING CALL SUCCESS RATE AND BASE STATION SYSTEM THEREOF

(75) Inventor: Su Luo, Guangdong Province (CN)

(73) Assignee: ZTE Corporation (CN)

( * ) Notice: Subject to any disclaimer, the term of this patent is extended or adjusted under 35 U.S.C. 154(b) by 337 days.

(21) Appl. No.: 13/147,546

(22) PCT Filed: Sep. 24, 2009

(86) PCT No.: PCT/CN2009/074203
§ 371 (c)(1),
(2), (4) Date: Aug. 2, 2011

(87) PCT Pub. No.: WO2010/069192
PCT Pub. Date: Jun. 24, 2010

(65) Prior Publication Data
US 2012/0021737 A1    Jan. 26, 2012

(30) Foreign Application Priority Data
Dec. 15, 2008 (CN) .......................... 2008 1 0241641

(51) Int. Cl.
*H04W 72/00* (2009.01)

(52) U.S. Cl.
USPC ........................................................ 455/450

(58) Field of Classification Search
USPC ........................................................ 455/450
See application file for complete search history.

(56) References Cited

U.S. PATENT DOCUMENTS

| | | | |
|---|---|---|---|
| 2003/0050086 A1* | 3/2003 | Lee et al. | 455/522 |
| 2003/0078067 A1* | 4/2003 | Kim et al. | 455/522 |
| 2003/0123413 A1* | 7/2003 | Moon et al. | 370/335 |
| 2003/0193915 A1* | 10/2003 | Lee et al. | 370/335 |
| 2003/0216156 A1* | 11/2003 | Chun | 455/562.1 |
| 2004/0053619 A1* | 3/2004 | Kim et al. | 455/445 |
| 2006/0142045 A1* | 6/2006 | Lee et al. | 455/522 |
| 2006/0183431 A1* | 8/2006 | Chang et al. | 455/69 |
| 2007/0037573 A1* | 2/2007 | Kyung et al. | 455/435.2 |

FOREIGN PATENT DOCUMENTS

| | | |
|---|---|---|
| CN | 1258400 A | 6/2000 |
| CN | 1366441 A | 8/2002 |
| CN | 101466140 A | 6/2009 |
| JP | 2001-216262 A | 8/2001 |
| KR | 2001-0066277 A | 7/2001 |

* cited by examiner

*Primary Examiner* — Nathan Mitchell
(74) *Attorney, Agent, or Firm* — Scully, Scott, Murphy & Presser, P.C.

(57) ABSTRACT

The present invention discloses a method for improving the call success rate and a base station system thereof, which send reverse power control bits by using a specific parameter value according to the distance between a user and a base station, so as to improve the probability that the base station captures the mobile station and thereby improve the call success rate. The method includes the following steps of: distinguishing user type according to information in an origination message from a mobile station, and setting an initial value of a forward transmission power; and a base station sending a forward traffic channel null frame to the mobile station according to the initial value of the forward transmission power, wherein the forward traffic channel null frame contains reverse power control bits information.

15 Claims, 3 Drawing Sheets

METHOD FOR IMPROVING CALL SUCCESS RATE AND BASE STATION SYSTEM THEREOF

FIELD OF THE INVENTION

The present invention relates to a call technology in a communication system, in particular to a method for improving the call success rate of a mobile station in a communication system and a base station system thereof.

BACKGROUND OF THE INVENTION

In a CDMA mobile communication system, a mobile station sends an origination message or a paging response message when a system is in an access state, and then waits for an acknowledge message (BSOrder) from a base station, switches to a corresponding traffic channel according to the indication of an extended channel assignment message (ECAM) after receiving the ECAM, and starts to send a traffic channel prefix in a reverse traffic channel after receiving two continuous good frames. After receiving (capturing) the traffic channel prefix, the base station sends an origination handshake message (BSAckOrder) to the mobile station, and the mobile station replies a response handshake message (MSAckOrder). After receiving the response handshake message (MSAckOrder), the base station sends a service negotiation message to the mobile station, and then the mobile station replies a service negotiation accomplishment message. Then, the whole origination call flow ends and enters a call state. The process is as shown in FIG. 1.

During the whole origination call flow, within a certain period, if any one of the two parties in the communication does not receive the corresponding message, for example, the mobile station does not receive the ECAM from the base station, the base station does not receive the traffic channel prefix from the mobile station, the mobile station does not receive the origination handshake message (BSAckOrder) from the base station, the base station does not receive the response handshake message (MSAckOrder) from the mobile station, or the base station or the mobile station does not receive the service negotiation message from the opposite party, the call will be failed.

For every step of a call, there are many ways to solve the problem of call failure, such as sending the ECAM repeatedly, improving the power of sending the traffic channel prefix by the mobile station, or sending the handshake message repeatedly by the base station, and etc.

As shown by the dashed lines in FIG. 1, according to the call flow, the process that the base station receives the traffic channel prefix sent by the mobile station in the reverse traffic channel is a capture process. The process is the first interaction of the traffic channel between the base station and the mobile station, in which a general forward null frame is sent to the mobile station according to a fixed gain, and a general reverse open loop power control bits are set to a fixed value, that is to say, the reverse power control bits are the same for any user and any capture duration, and all the mobile stations within the coverage of the base station transmit the reverse traffic channel prefix by using the same power. Using this transmitting method, if the quality of the reverse link is poor, or a mobile station is far from the base station and located at the edge of the cell, or a mobile station suddenly enters a shadow area resulting in fast fading, it is easy to occur that the base station fails to capture the prefix of the mobile station or the mobile station very likely can not receive the null frame sent from the base station, which results in capture failure and thus results in the failure of the present call. In general, 70% of call failures are caused by the capture failure.

Therefore, there are some problems in the prior art which requires to be further improved.

SUMMARY OF THE INVENTION

An object of the present invention is to provide a method for improving call success rate and a base station system thereof, which send reverse power control bits according to a specific parameter value, based on the distance of a user from a base station, and thereby improve the probability of the base station for capturing a mobile station, so as to improve the call success rate.

To solve the problem above, the present invention adopts the following technical solutions.

The method for improving call success rate provided by the invention includes the following steps of:

distinguishing user type according to information in an origination message from a mobile station, and setting an initial value of a forward transmission power; and a base station sending a forward traffic channel null frame to the mobile station according to the initial value of the forward transmission power, wherein the forward traffic channel null frame contains reverse power control bits information.

In the method, wherein the method further comprises the following dynamical adjustment step of:

when the base station does not capture traffic channel prefix information sent from the mobile station, increasing the forward transmission power of the forward traffic channel null frame by degrees in turn based on the initial value of the forward transmission power, until the base station captures the traffic channel prefix information from the mobile station or stops the capture.

In the method, wherein the method further comprises the fol owing dynamical adjustment step of:

when the base station does not capture traffic channel prefix information sent from the mobile station, dynamically adjusting the reverse power control bits information filled in the forward traffic channel null frame according to an increasing power mode, until the base station captures the traffic channel prefix information from the mobile station or stops the capture.

In the method, wherein the process of dynamically adjusting the reverse power control bits information according to the increasing power mode is: based on an initial value of the reverse power control bits information, increasing the reverse power control bits information set by reverse control bits once every other a preset time interval according to a preset gain.

In the method, wherein the method further comprises the following dynamical adjustment step of:

when the base station does not capture traffic channel prefix information from the mobile station, increasing by degrees in turn the forward transmission power of the forward traffic channel null frame based on an initial value of the reverse power control bits information, and at the same time dynamically adjusting the reverse power control bits information filled in the forward traffic channel null frame according to a increasing power mode, until the base station captures the traffic channel prefix information from the mobile station or stops the capture.

In the method, wherein after each dynamical adjustment of the forward transmission power and/or the reverse power control bits information, the method further comprises:

judging whether a current forward transmission power is overloaded, wherein if not overloaded, it sends the forward traffic channel null frame to the mobile station according to the adjusted data; and if overloaded, it decreases the forward transmission power; and judging whether the base station captures the traffic channel prefix information sent by the mobile station, wherein if not, it returns to continuing the dynamical adjustment step.

In the method, wherein after each dynamical adjustment of the forward transmission power and/or the reverse power control bits information, the method further comprises:

judging whether a reverse reception transmission power of the base station is overloaded, wherein if overloaded, it adjusts the reverse power control bits information in the forward traffic channel null frame for indicating the mobile station to reduce or maintain the power.

In the method, wherein the judgment for stopping the capture is determined by setting a timer, in which the timing begins at the time of beginning to capture the traffic channel prefix information, and it is judged that the capture is failed when the timer expires, and the base station stops the capture.

The present invention also provides a base station system for improving call success rate, wherein the system includes: a sending unit adapted to transmit a forward traffic channel null frame, and further includes:

a sorting unit adapted to distinguish user type according to information in an origination message from a mobile station; and an initial value setting unit adapted to set an initial value of a forward transmission power according to the result of the sorting unit, wherein the sending unit sends a forward traffic channel null frame to the mobile station according to the initial value of the forward transmission power set by the initial value setting unit, and adds reverse power control bits information in the forward traffic channel null frame.

In the system, wherein the system further includes:

a judging unit, adapted to judge whether the base station captures traffic channel prefix information sent by the mobile station, and send a control instruction to a dynamically adjusting unit when the base station does not capture the traffic channel prefix information sent from the mobile station; and the dynamical adjusting unit, adapted to increase by degrees, according to the control instruction of the judging unit, the forward transmission power of the forward traffic channel null frame, and/or dynamically adjust the reverse power control bits information filled in the forward traffic channel null frame according to a increasing power mode, and then make the sending unit send the forward traffic channel null frame to the mobile station according to the adjusted parameter.

Effects of the present invention: comparing with the prior art, the present invention, based on the method of the reverse open loop power control, divides users into different types according to the distance of a user from a base station, and then sets the initial value of the forward transmission power according to different types, in which the greater the distance is, the larger the initial value is, so that this method is adaptive to guarantee that the forward traffic channel null frame or the traffic channel prefix information of the mobile station can be provided with different initial values of the forward transmission power according to the different link conditions, which improves the probability of the base station for capturing the mobile station, and thereby improves the call success rate between the base station and mobile station. Furthermore, the present invention enhances the anti-interference ability of the system by dynamically adjusting the forward transmission power and/or the reverse power control bits in the null frame, so as to improve the capture success rate even in the case that the qualities of the forward and reverse links are poor, thereby continuing the subsequent call flow and improving the call success rate.

DETAILED DESCRIPTION OF THE EMBODIMENTS

Figure 1:
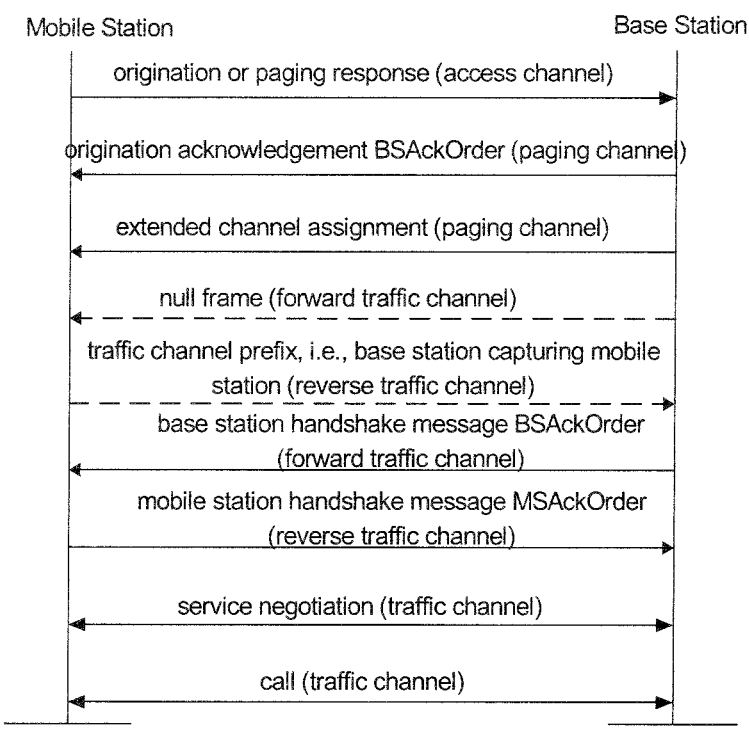
FIG. 1 is a schematic diagram of a general capture process.

The technical solutions of the present invention will be described in detail with reference to the drawings hereinafter.

A base station sends power control bits to a mobile station by a null frame of a forward channel, and the mobile station increases or decreases transmission power according to the indication of the power control bits, the process of which is reverse open loop power control. In a capture process between the base station and the mobile station, the mobile station sends a reverse traffic channel prefix to the base station according to the power indicated by the power control bits in the reverse open loop power control method. To solve the problem in the prior art that the mobile stations within the coverage of the same base station each transmit the reverse traffic channel prefix by using the same power, or the problem of low call success rate which is cased by the base station sending the forward traffic channel null frame to the mobile stations by using the same forward transmission power, the present invention employs the following technical solution.

Firstly, the user type is distinguished according to information in an origination message from the mobile station, and an initial value of a forward transmission power is set. Herein, different initial values of the forward transmission power can be set for different user types.

Then, the base station sends a forward traffic channel null frame to the mobile station according to the initial value of the forward transmission power, wherein the forward traffic channel null frame contains the reverse power control bits information.

In the above technical solution, the users are distinguished according to the information in the origination messages of the mobile stations (for example, mobile phones), the object of which is to set an initial value of open loop power control bits and an initial value of the transmission power in the next step. The information for distinguishing users is from the origination messages sent by the mobile phones, wherein the origination message has plural pieces of information which can be used for implementing this step, such as the earliest PN offset (EPN, i.e., the dual distance from a base station to a mobile phone), an initial power and etc. For example, the user type is distinguished according to the EPN, that is, the larger the EPN is, the farther a mobile station is away from a base station, and the higher the user grade is; and the smaller the EPN is, the closer a mobile station is to a base station, and the lower the user grade is.

After the user type is determined, an initial value of the reverse power control bits information, and then an initial power of a forward sending null frame (i.e., an initial value of the forward transmission power) should be set. Herein, the higher the user grade is (the farther it is away from the base station), the larger the initial transmission power of the forward null frame is, and the larger the initial value of the reverse power control bits is; and the lower the user grade is (the closer it is to the base station), the smaller the initial transmission power of the forward null frame is, and the smaller the initial value of the reverse power control bits is. Therefore, for the user having larger dual distance, the set initial values of the forward transmission power and the reverse power control bits information are larger relatively.

Obviously, in the present invention, according to the distance of the user from the base station, the base station sends the reverse power control bits according to a specific method, and the mobile station sends the traffic channel prefix information by using different transmission power, so as to not only improve the success rate of the capture but also prevent reverse overload, thereby improving the call success rate.

Figure 2:
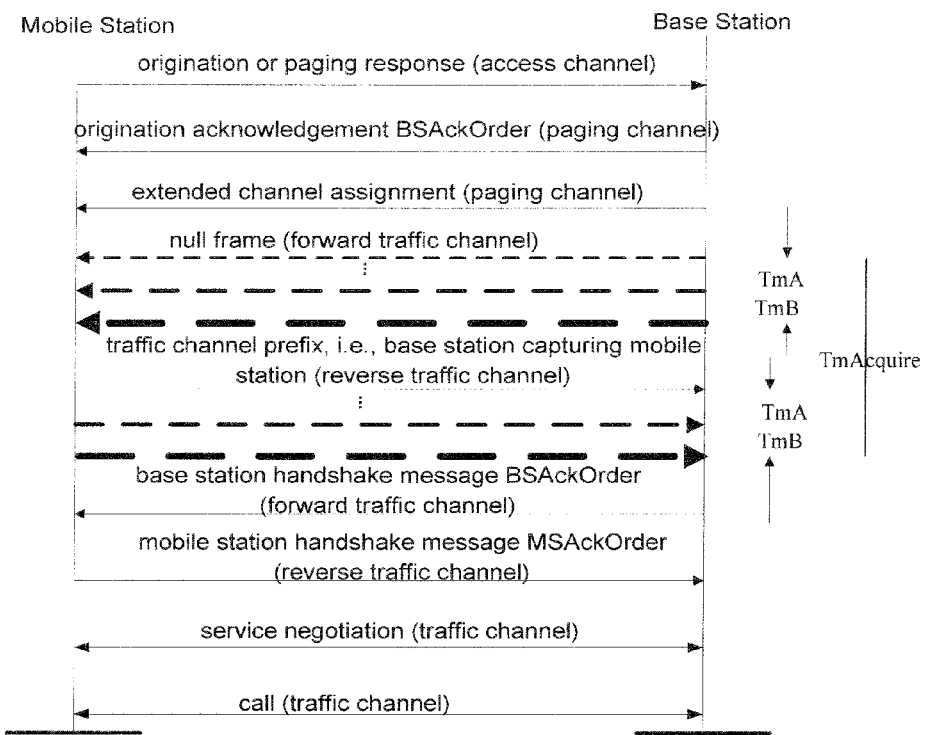
FIG. 2 is a schematic diagram of a capture process of the present invention.

As shown in FIG. 2, the improvement of the present invention in terms of the call flow is mainly reflected by the capture process of the base station receiving the traffic channel prefix sent by the mobile station in the reverse traffic channel, which is shown as the dashed lines in FIG. 2. After the null frame of the forward traffic channel is sent according to the technical solution above, it is possible that the base station fails to capture the traffic channel prefix information sent by the mobile station, and then the present invention can solve the problem above by dynamically adjusting the sending power by the following three ways.

In the first way, when the base station does not capture the traffic channel prefix information sent from the mobile station, the forward transmission power of the forward traffic channel null frame is increased by degrees sequentially based on the initial value of the forward transmission power, until the base station captures the traffic channel prefix information from the mobile station or stops the capture. As shown in FIG. 2, generally during a call flow, i.e. the base station sends a null frame to the mobile station, the content of the null frame is the reverse power control bits. When continuously receiving two good null frames, the mobile station adjusts the reverse transmission power according to the indication of the power control bits in the null frame, and sends the traffic channel prefix. Supposed that the time of sending the null frame according to the initial value of the forward transmission power is TmA, and the interval of sending the null frame for adjusting the forward transmission power is TmB, when the base station does not receive the traffic channel prefix information after the TmA, the null frame is transmitted within the TmB by increasing the forward transmission power, so as to increase the probability of the mobile station for receiving the null frame of the base station, and avoid the case that the mobile station has reduced the call success rate caused by the null frame of the base station being not received.

In the second way, when the base station does not capture the traffic channel prefix information sent from the mobile station, based on the initial value of the reverse power control bits information, the reverse power control bits information filled in the forward traffic channel null frame is dynamically adjusted in turn according to an increasing power mode, until the base station captures the traffic channel prefix information from the mobile station or stops the capture. Generally during a call flow, the base station sends a null frame to a user according to the initial value of the forward transmission power, wherein the null frame contains the reverse power control bits information which is set according to the initial value of the reverse power control bits, and the reverse power control bits information is used to indicate the power with which the mobile station sends the reverse traffic channel prefix to the base station. Supposed that the time of sending the null frame according to the initial value of the forward transmission power is TmA, and the interval of sending the null frame for adjusting the reverse power control bits information is TmB, when the base station does not receive the traffic channel prefix information after TmA, the null frame can be transmitted within the TmB by increasing by degrees the reverse power control bits information, so as to increase the power of the mobile station for sending the reverse traffic channel prefix to the base station, and avoid the case that the base station has reduced the call success rate caused by failing to receive the prefix information from the mobile station, thereby improving the call success rate. Herein, the process of dynamically adjusting the reverse power control bits information according to the increasing power mode is: based on an initial value of the reverse power control bits information, the reverse power control bits information set by the reverse control bits is increased once every other a preset time interval according to a preset gain. Herein, the preset gain is determined according to the dual distance from a base station to a mobile phone, wherein for a user having larger dual distance, the preset gain set is larger.

In the third way, when the base station does not capture the traffic channel prefix information from the mobile station, the forward transmission power of the forward traffic channel null frame is increased by degrees in turn based on the initial value of the reverse power control bits information, and at the same time the reverse power control bits information filled in the forward traffic channel null frame is dynamically adjusted according to the increasing power mode, until the base station captures the traffic channel prefix information from the mobile station or stops the capture. As shown in FIG. 2, supposed that the time of sending the null frame according to the initial value of the forward transmission power is TmA, and the interval of transmitting the null frame for adjusting the reverse power control bits information and the forward transmission power is TmB, when the base station does not receive the traffic channel prefix information after TmA, the null frame can be transmitted within the TmB by increasing by degrees the reverse power control bits information and the forward transmission power, so as to simultaneously increase the power of the mobile station for sending the reverse traffic channel prefix to the base station, and the power of the base station for sending the null frame to the mobile station, and guarantee the capture success between the base station and mobile station, thereby improving the call success rate. In the above, the judgment for stopping the capture is determined by setting a timer, in which the timing begins at the time of beginning to capture the traffic channel prefix information, and it is judged that the capture is failed when the timer expires, and the base station stops the capture.

It can be concluded according to the three circumstances above, the intensity of a base station for sending the null frame to a mobile station can be increased by adjusting the forward transmission power, and the intensity of a mobile station for sending the traffic channel prefix information to a base station can be increased by adjusting the reverse power control bits, so that the probability of the base station for capturing the traffic channel prefix information can be improved.

The technical solution of the invention will be described in detail with reference to the specific implementing flow hereinafter.

Figure 3:
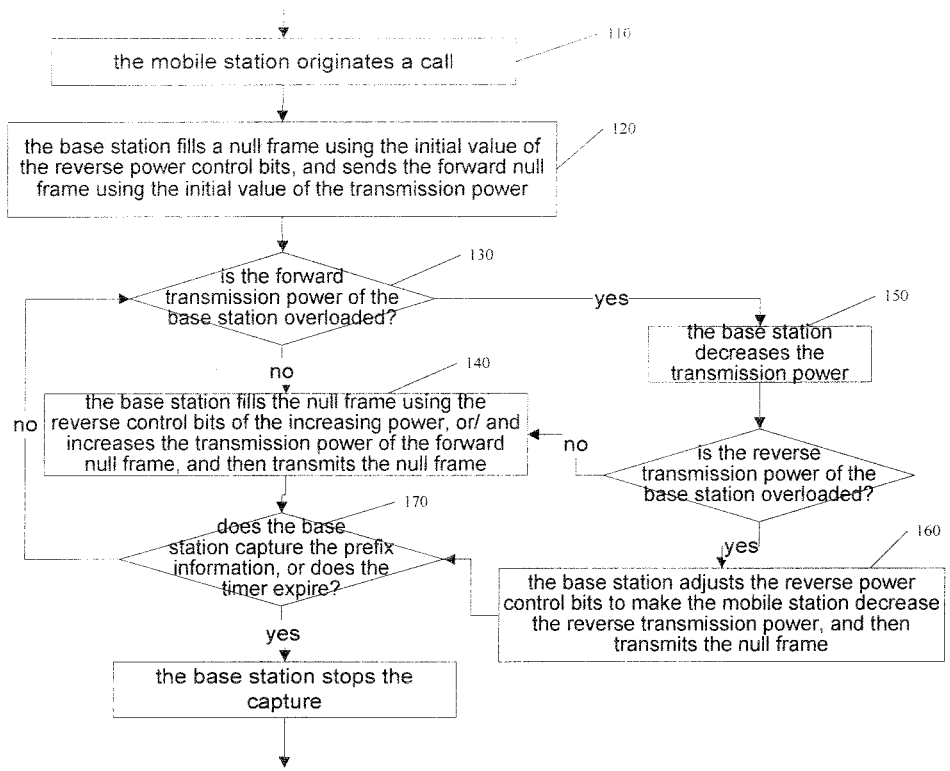
FIG. 3 is a flow chart of a capture process of the present invention.

Referring to FIG. 3, the specific embodiment of the present invention will be described in detail hereinafter.

Step 110, a base station divides users into multiple grades according to an EPN (the earliest PN offset, i.e., the dual distance from the base station to a mobile station), and for each grade, an initial transmission power and an initial value of reverse power control bits of a null frame are set. The smaller the EPN is, the closer a user is to the base station, and the smaller the initial value is. The matching relationship of the user grades, the EPN, the initial value of the transmission power of the forward null frame, the initial value of reverse power control bits is as the following table.

| User | EPN | Initial value of reverse power control bits and preset gain | initial value of transmission power of forward null frame |
|---|---|---|---|
| First type user | 200-400 | 0 dB increased per second | 169 |
| Second type user | 400-800 | 25 dB increased per second | 179 |
| Third type user | 800-1200 | 50 dB increased per second | 189 |
| Fourth type user | Over 1200 | 100 dB increased per second | 199 |

The mobile station originates a call, and the base station determines the user grade according to the EPN in the origination message, so as to determine the initial forward null frame transmission power of the user and the initial value of the reverse power control bits. It can be concluded from the table above that, from the first type user to the fourth type user, the EPN is larger and larger, so the corresponding initial values of the forward transmission power become larger in turn, and the initial values of the reverse power control bits and the preset grains become larger in turn as well.

Step 120, referring to FIG. 2, after sending an ECAM, within the TmA, the base station fills the null frame using the initial reverse power control bits and sends the forward null frame using the initial transmission power.

Step 130, the base station judges whether the forward transmission power of the current sector is overload, wherein if the forward transmission power is not overload, step 140 is executed; and if the forward transmission power is overload, step 150 is executed.

Step 140, the base station fills the null frame using the reverse control bits of the increasing power mode (that is, in the null frame, the reverse power control bits information which is set according to the reverse control bits of the increasing power mode), and/or the base station increases the transmission power of the forward null frame, and then transmits the null frame within the TmB with reference to FIG. 2. The step 130 is repeated, until the condition of step 160 is satisfied, and the base station stops the capture.

Step 150, the base station decreases the transmission power and judges whether the reverse power is overload, wherein if the reverse power is overload, the step 160 is executed; and if the reverse power is not overload, the step 140 is executed.

Step 160, the base station adjusts the reverse power control bits to make the mobile station decrease the reverse transmission power, and then step 170 is executed.

Step 170, it is judged whether the base station captures the prefix information of the mobile station or whether the capture timer TmAcquire set by the base station expires, wherein if yes, the base station stops the capture; and if no, the flow returns to the step 130. After the TmA and multiple TmBs, the threshold value of the capture timer TmAcquire can not be exceeded.

In the above step 140, the manner that the base station fills the null frame using the reverse control bits of the increasing power mode and the manner that the base station increases (adjusts it to be larger) the transmission power of the forward null frame can be carried out separately or together. The specific implementation can be learned by reference to the description of the above three circumstance of dynamically adjusting the sending power.

From the embodiment above, to avoid the overload of fomard power or, reverse power, the present invention can develop the technical solution above by using the following method.

After each dynamical adjustment of the forward transmission power and/or the reverse power control bits information, the first step is to judge whether the current forward transmission power is overloaded, wherein if not-overloaded, the forward traffic channel null frame is sent to the mobile station according to the adjusted data, and if the forward transmission power reaches a maximum value, the forward null frame is transmitted according to the maximum value; and if overload, the forward transmission power is decreased, the second step is to judge whether the base station captures the traffic channel prefix information sent by the mobile station, wherein if no, the flow returns to the process of the dynamically adjusting the sending power. By checking whether the forward power of the base station is overloaded after each dynamical adjustment, the present invention can guarantee that the forward power will not be overload of the base station caused by increasing the power of the forward null frame; wherein if the forward power is not overloaded, the null frame can be sent by using a larger power, so as to improve the probability of the mobile station for receiving the null frame.

In addition, after each dynamical adjustment of the forward transmission power and/or the reverse power control bits information, it is judged that whether the reverse receiving transmission power of the base station is overloaded, wherein if overloaded, the reverse power control bits information in the forward traffic channel null frame is adjusted to indicate the mobile station to reduce or maintain the power; if not-overloaded, the reverse power control bits indicating the mobile station to increase the power is filled in turn to send the null frame, and if the setting of the reverse power control bits reaches a maximum value, the reverse power control bits information of the null frame is set according to the maximum value. By checking whether the reverse receiving power of the base station is overloaded after each dynamical adjustment, the present invention can guarantee that the reverse power of the base station will not be overloaded which is caused by the mobile station sending the prefix in a large power according to the indication of the reverse power control bits; and if the reverse receiving power is not overloaded, the base station can indicate the mobile station to transmit the prefix in a larger power by the reverse power control bits, so as to improve the probability of the base station for capturing the prefix.

Figure 4:
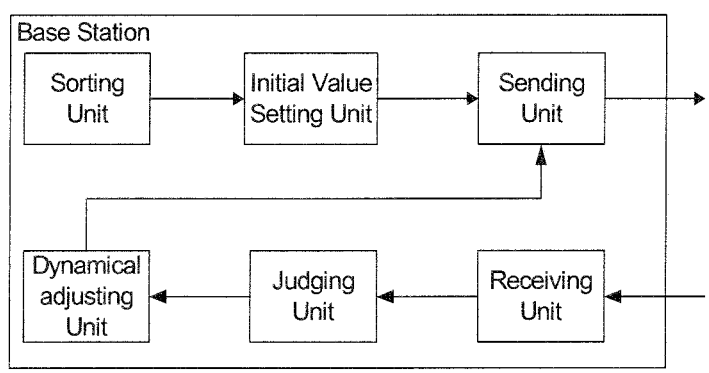
FIG. 4 is a structural schematic diagram of a base station system of the present invention.

The methods based on the above can be realized on a base station by software programming. The invention further provides a base station system for improving the call success rate, as shown in FIG. 4. The system includes: a sending unit which is adapted to transmit a forward traffic channel null frame, a sorting unit which is adapted to distinguish user type according to information in an origination message from a mobile station, and an initial value setting unit which is adapted to set an initial value of a forward transmission power according to the result of the sorting unit, wherein the sending unit sends a forward traffic channel null frame to the mobile station according to the initial value of the forward transmission power set by the initial value setting unit, and adds reverse power control bits information in the forward traffic channel null frame. Furthermore, the system of the present invention further includes: a judging unit which is adapted to judge whether the base station captures traffic channel prefix information sent by the mobile station, and send a control instruction to a dynamical adjusting unit when the base station does not capture the traffic channel prefix information sent by the mobile station, and the dynamical adjusting unit which is adapted to, according to the control instruction of the judging unit, increase by degrees the forward transmission power of the forward traffic channel null frame, and/or, dynamically adjust the reverse power control bits information filled in the forward traffic channel null frame according to a increasing power mode, and then make the sending unit send the forward traffic channel null frame to the mobile station according to the adjusted parameter.

To sum up, because the higher the transmission power of the mobile station is, the easier the base station is to capture the information, which, however, easily causes the reverse power overload of the base station, resulting in the base station failing to demodulate the reverse signals. Therefore, based on the method of the reverse open loop power control, the present invention divides users into different types according to the distances of the users from the base station, and sends the reverse power control bits according to the particular method above, and the mobile station sends the traffic channel prefix by using different transmission power, so as to not only improve the capture success rate but also prevent the reverse overload, thereby improving the call success rate.

According to appropriate settings of the forward transmission power and the reverse power control bits information, the present invention can transmit a null frame with higher transmission power to make the mobile station easily receive the null frame when the quality of the forward link is poor; and the reverse power control bits indicate the mobile station to send a prefix with higher power to make the base station easily capture information when the quality of the reverse link is poor. After the base station sending the forward null frame, and if not receiving the prefix information sent by the mobile station, the base station dynamically, within each time interval, sets the reverse power control bits of the user to fill in the null frame, or dynamically adjusts the forward transmission power to transmit the null frame, as indicated by the dashed lines shown in FIG. 2. There is a time interval during the mobile station receiving the null frame, the mobile station switching to the traffic channel and sending the prefix, and the base station capturing the mobile station. During this time interval, the transmission power of the forward null frame is gradually increased, and the mobile station is made to send the prefix in the increasing power mode by using the reverse power control bits, so that the capture success rate can be further improved.

Many other embodiments can be applied to the present invention, and without departing from the sprit and essence of the present invention, corresponding changes and variations can be made by those skilled in the art according to the present invention However, all the corresponding changes and variations shall be included in the protection scope of the appended claims.

The invention claimed is:

1. A method for improving call success rate, comprising:
distinguishing user type according to information in an origination message from a mobile station, and setting an initial value of a forward transmission power; and
a base station sending a forward traffic channel null frame to the mobile station according to the initial value of the forward transmission power, wherein the forward traffic channel null frame contains reverse power control bits information, wherein the method further comprises the following dynamical adjustment step of:
when the base station does not capture traffic channel prefix information sent from the mobile station, increasing the forward transmission power of the forward traffic channel null frame by degrees in turn based on the initial value of the forward transmission power, until the base station captures the traffic channel prefix information from the mobile station or stops the capture.

2. The method according to claim 1, wherein the method further comprises the following dynamical adjustment step of:
when the base station does not capture traffic channel prefix information sent from the mobile station, dynamically adjusting the reverse power control bits information filled in the forward traffic channel null frame according to an increasing power mode, until the base station captures the traffic channel prefix information from the mobile station or stops the capture.

3. The method according to claim 2, wherein the process of dynamically adjusting the reverse power control bits information according to the increasing power mode is: based on an initial value of the reverse power control bits information, increasing the reverse power control bits information set by reverse control bits once every other a preset time interval according to a preset gain.

4. The method according to claim 1, wherein the method further comprises the following dynamical adjustment step of:
when the base station does not capture traffic channel prefix information from the mobile station, increasing by degrees in turn the forward transmission power of the forward traffic channel null frame based on an initial value of the reverse power control bits information, and at the same time dynamically adjusting the reverse power control bits information filled in the forward traffic channel null frame according to a increasing power mode, until the base station captures the traffic channel prefix information from the mobile station or stops the capture.

5. The method according to claim 1, wherein after each dynamical adjustment of the forward transmission power and/or the reverse power control bits information, the method further comprises:
judging whether a current forward transmission power is overloaded, wherein if not overloaded, it sends the forward traffic channel null frame to the mobile station according to the adjusted data; and if overloaded, it decreases the forward transmission power; and
judging whether the base station captures the traffic channel prefix information sent by the mobile station, wherein if not, it returns to continuing the dynamical adjustment step.

6. The method according to claim 1, wherein after each dynamical adjustment of the forward transmission power and/or the reverse power control bits information, the method further comprises:
judging whether a reverse reception transmission power of the base station is overloaded, wherein if overloaded, it adjusts the reverse power control bits information in the forward traffic channel null frame for indicating the mobile station to reduce or maintain the power.

7. The method according to claim 1, wherein the judgment for stopping the capture is determined by setting a timer, in which the timing begins at the time of beginning to capture the traffic channel prefix information, and it is judged that the capture is failed when the timer expires, and the base station stops the capture.

8. A base station system for improving call success rate, wherein the system comprises a hardware processor configured to:
   transmit a forward traffic channel null frame,
   distinguish user type according to information in an origination message from a mobile station,
   set an initial value of a forward transmission power according to the result of distinguishing user type according to information in an origination message from the mobile station, wherein a forward traffic channel null frame is sent to the mobile station according to the initial value of the forward transmission power, and reverse power control bits information is added in the forward traffic channel null frame,
   judge whether the base station captures traffic channel prefix information sent by the mobile station, and send a control instruction when the base station does not capture the traffic channel prefix information sent from the mobile station, and
   increase by degrees, according to the control instruction, the forward transmission power of the forward traffic channel null frame, and/or dynamically adjust the reverse power control bits information filled in the forward traffic channel null frame according to a increasing power mode, and subsequently send the forward traffic channel null frame to the mobile station according to the adjusted parameter.

9. The method according to claim 2, wherein after each dynamical adjustment of the forward transmission power and/or the reverse power control bits information, the method further comprises:
   judging whether a current forward transmission power is overloaded, wherein if not overloaded, it sends the forward traffic channel null frame to the mobile station according to the adjusted data; and if overloaded, it decreases the forward transmission power; and
   judging whether the base station captures the traffic channel prefix information sent by the mobile station, wherein if not, it returns to continuing the dynamical adjustment step.

10. The method according to claim 4, wherein after each dynamical adjustment of the forward transmission power and/or the reverse power control bits information, the method further comprises:
    judging whether a current forward transmission power is overloaded, wherein if not overloaded, it sends the forward traffic channel null frame to the mobile station according to the adjusted data; and if overloaded, it decreases the forward transmission power; and
    judging whether the base station captures the traffic channel prefix information sent by the mobile station, wherein if not, it returns to continuing the dynamical adjustment step.

11. The method according to claim 2, wherein after each dynamical adjustment of the forward transmission power and/or the reverse power control bits information, the method further comprises:
    judging whether a reverse reception transmission power of the base station is overloaded, wherein if overloaded, it adjusts the reverse power control bits information in the forward traffic channel null frame for indicating the mobile station to reduce or maintain the power.

12. The method according to claim 4, wherein after each dynamical adjustment of the forward transmission power and/or the reverse power control bits information, the method further comprises:
    judging whether a reverse reception transmission power of the base station is overloaded, wherein if overloaded, it adjusts the reverse power control bits information in the forward traffic channel null frame for indicating the mobile station to reduce or maintain the power.

13. The method according to claim 2, wherein the judgment for stopping the capture is determined by setting a timer, in which the timing begins at the time of beginning to capture the traffic channel prefix information, and it is judged that the capture is failed when the timer expires, and the base station stops the capture.

14. The method according to claim 4, wherein the judgment for stopping the capture is determined by setting a timer, in which the timing begins at the time of beginning to capture the traffic channel prefix information, and it is judged that the capture is failed when the timer expires, and the base station stops the capture.

15. A base station system for improving call success rate, comprising:
    a first hardware processor configured to transmit a forward traffic channel null frame,
    a second hardware processor configured to distinguish user type according to information in an origination message from a mobile station;
    a third hardware processor configured to set an initial value of a forward transmission power according to the result of the second hardware processor, wherein the first hardware processor sends a forward traffic channel null frame to the mobile station according to the initial value of the forward transmission power and adds reverse power control bits information in the forward traffic channel null frame;
    a fourth hardware processor configured to judge whether the base station captures traffic channel prefix information sent by the mobile station and send a control instruction when the base station does not capture the traffic channel prefix information sent from the mobile station; and
    a fifth hardware processor configured to increase by degrees, according to the control instruction, the forward transmission power of the forward traffic channel null frame, and/or dynamically adjust the reverse power control bits information filled in the forward traffic channel null frame according to a increasing power mode, and subsequently render the first hardware processor to forward traffic channel null frame to the mobile station according to the adjusted parameter.

* * * * *